(12) United States Patent
Sheridan

(10) Patent No.: US 6,223,616 B1
(45) Date of Patent: May 1, 2001

(54) STAR GEAR SYSTEM WITH LUBRICATION CIRCUIT AND LUBRICATION METHOD THEREFOR

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/470,230

(22) Filed: Dec. 22, 1999

(51) Int. Cl.[7] .................................................. F16H 57/04
(52) U.S. Cl. ........................... 74/468; 475/159; 184/6.12
(58) Field of Search ............................ 475/159; 74/467, 74/468; 184/6.12

(56) References Cited

U.S. PATENT DOCUMENTS

| | | | |
|---|---|---|---|
| 2,591,743 | 4/1952 | Thompson | 475/346 |
| 2,684,591 | 7/1954 | Lundquist | 73/862.31 |
| 2,703,021 | 3/1955 | Stoeckicht | 74/410 |
| 2,749,778 | 6/1956 | Kuhn | 475/347 |
| 3,160,026 | 12/1964 | Rosen | 74/410 |
| 3,307,433 | 3/1967 | Bennett et al. | 475/342 |
| 3,352,178 | 11/1967 | Lindgren et al. | 475/343 |
| 3,650,353 | 3/1972 | Abbott | 184/6.12 |
| 3,776,067 | 12/1973 | DeBruyne et al. | 475/159 |
| 3,960,029 | * 6/1976 | Eichinger | 184/3.12 X |
| 4,271,928 | 6/1981 | Northern | 184/6.4 |
| 4,378,711 | 4/1983 | Daniel | 74/467 |
| 4,583,413 | * 4/1986 | Lack | 74/467 X |
| 5,102,379 | * 4/1992 | Pagluica et al. | 475/159 X |
| 5,433,674 | * 7/1995 | Sheridan et al. | 475/346 |
| 5,466,198 | * 11/1995 | McKibbin et al. | 475/346 |
| 5,472,059 | * 12/1995 | Schlosser et al. | 475/159 X |
| 5,472,383 | 12/1995 | McKibbin | 475/159 |
| 5,643,126 | * 7/1997 | Hotta et al. | 475/159 |
| 5,685,797 | * 11/1997 | Barnsby et al. | 475/331 |
| 5,830,098 | * 11/1998 | Kimes | 475/159 |

* cited by examiner

Primary Examiner—Charles A Marmor
Assistant Examiner—Ankur Parekh
(74) Attorney, Agent, or Firm—Kenneth C. Baran

(57) ABSTRACT

A star configured epicyclic gear train includes a sun gear 10, a plurality of star gears 16 supported on bearings 18, a ring gear 51 and a set of baffles 44 disposed between the star gears. A single lubricant circuit serves as the exclusive means for supplying lubricant successively to the bearings, the sun/star mesh and the star/ring mesh. A variant of the gear system includes an auxiliary lubricant circuit featuring a set of spray bars 82 for supplying lubricant to the sun/star mesh and the star/ring mesh. The primary and auxiliary circuits share a common lubricant discharge path representing the exclusive means for evacuating both the primary and auxiliary lubricant from the gear system. Preferably, the auxiliary lubricant circuit is selectively operable. The inventive gear system addresses a number of difficulties related to lubricating and evacuating lubricant from a star configured epicyclic gear system.

15 Claims, 5 Drawing Sheets

STAR GEAR SYSTEM WITH LUBRICATION CIRCUIT AND LUBRICATION METHOD THEREFOR

TECHNICAL FIELD

The present invention relates to epicyclic gear trains and particularly to an epicyclic gear train configured as a star gear system and having effective, simple means for supplying lubricant to selected components of the gear system and for recovering used lubricant.

BACKGROUND OF THE INVENTION

Epicyclic gear trains are used to reduce rotational speeds in various types of machinery. Depending on the speed reduction ratio desired, an epicyclic gear train can be configured as either a planetary system or a star system. A planetary system includes a central sun gear and a set of planet gears rotatably mounted on a gear carrier by bearings. The planet gears are circumferentially distributed about the periphery of the sun gear so that the planet gears mesh with the sun gear. A mechanically grounded, internally toothed ring gear circumscribes and meshes with the planet gears. Input and output shafts extend from the sun gear and gear carrier respectively. In operation, the input shaft rotatably drives the sun gear, compelling each planet gear to rotate about its own axis and, because the ring gear is mechanically grounded, causing the planet gears to orbit the sun gear. The planet gear orbital motion turns the carrier, and hence the output shaft, in the same direction as the input shaft.

A star system is similar to the above described planetary system except that the gear carrier is mechanically grounded, the ring gear is rotatable and the output shaft extends from the ring gear. Because the carrier is grounded, the "planet" gears cannot orbit the sun and therefore are referred to as star gears. In operation, the input shaft rotatably drives the sun gear, compelling each star gear to rotate about its own axis. The rotary motion of the star gears turns the ring gear, and hence the output shaft, in a direction opposite that of the input shaft.

An epicyclic gear train, whether configured as a planetary system or a star system, also has a lubrication system to lubricate and cool the gear teeth and bearings and to remove used lubricant so that it can be reconditioned (cooled, filtered, de-aerated) and reused. It is desirable to remove the used lubricant as completely and quickly as possible, otherwise the gears continually agitate the residual lubricant. Agitation of the residual lubricant degrades the power transmission efficiency of the gear system and elevates the lubricant temperature, making it more difficult to cool the lubricant to render it suitable for repeated use as a heat transfer medium. If the gear train is a component of an aircraft engine, degraded efficiency is unacceptable because it reduces aircraft range and/or payload. The problem of elevated lubricant temperature can be addressed with larger, higher capacity heat exchangers. However larger heat exchangers are unacceptable because they contribute undesirable weight and consume precious space on board the engine or aircraft.

U.S. Pat. No. 5,472,383 discloses a lubricant supply and recovery system for a planetary gear system. Noteworthy features of the system include a set of lubricant spray bars 32 intermediate each pair of planet gears 10, a set of interplanet baffles 80 each having a trough 82, and a set of collection channels 56. In operation, the spray bars 32 direct lubricant jets 34, 36 toward the sun and planet gears 8, 10. Most of the lubricant 34 passes through the sun/planet mesh. Much of the lubricant that passes through the sun/planet mesh is urged axially outwardly by the gear mesh and directly enters the collection channels 56. The balance of the lubricant that passes through the sun/planet mesh, along with lubricant reflected from the sun gear, is centrifuged into the nearby baffle trough 82, urged through outlets 84 in the planet carrier and finally deposited in the nonrotating collection channels 56. Meanwhile, the planet gears 10 carry lubricant 36 radially outwardly and into the planet/ring mesh. Lubricant expelled from the planet/ring mesh then enters the collection channels 56. Concurrently, pressurized lubricant enters the narrow bearing annulus (unnumbered) defined by the outer surface 44 of each journal bearing 16 and the inner surface 46 of the corresponding planet gear 10. Lubricant discharged from the bearing annuli enters the collection channels 56. Lubricant collected by the channels 56 enters a drain line 62, which conveys the lubricant to the lubrication system coolers, filters and de-aerators.

Despite the merits of the above described planetary lubrication system, it suffers from at least five shortcomings when applied to a star system. First, it relies on the centrifugal forces arising from carrier rotation to evacuate used lubricant. These forces are absent in the star system because the gear carrier is mechanically grounded. Second, the disclosed planetary system suffers from the complexity of two lubricant circuits, one to serve the planet gear journal bearings and one to serve the gear meshes. Both circuits are necessary. The gear lubrication circuit is necessary because the bearing lubricant, upon exiting the bearing annuli, is centrifuged away from the sun/planet mesh and so is unavailable to lubricate that mesh. The bearing lubrication circuit is necessary because the gear lubricant, after having been discharged from the spray bars, cannot be locally repressurized and introduced into the bearing annuli. Although the two circuits may share certain components (e.g. coolers, pumps, filters and de-aerators) other components (e.g. supply lines, spray bars) are unshared and introduce unwelcome complexity. Third, the presence of the dual lubricant circuits dictates that sufficient lubricant be available to concurrently supply both circuits, a distinct disadvantage in aircraft applications where space is at a premium and excess weight is always undesirable. Fourth, because the bearing lubricant cannot serve the gear meshes and vice versa, lubricant must be supplied in parallel to both the bearings and the gear meshes. As a result, a greater quantity of lubricant enters the gear system than would be the case if the bearings and gears were lubricated in series. The excess lubricant can exceed the lubricant evacuation capacity of the gear system thereby increasing lubricant residence time. The increased residence time provides additional opportunity for lubricant agitation and the concomitant loss of transmission efficiency and increased lubricant temperature described above. Fifth, the bearing lubricant and gear lubricant typically originate from a common source. This makes it impractical to customize the lubricant temperature to optimally satisfy the requirements of both the bearing annulus, which requires relatively cool lubricant, and the gear meshes, which benefit from warmer lubricant.

What is needed is a simple lubrication system for supplying lubricant to both the star gear bearings and the gear meshes in a star configured epicyclic gear train and for quickly and effectively evacuating used lubricant.

SUMMARY OF THE INVENTION

According to one aspect of the invention, a star configured epicyclic gear train includes a set of inter-star baffles for constraining the flow of lubricant and a lubricant circuit that serves as the exclusive means for successively lubricating the star gear bearings, the sun/star gear mesh and the star/ring gear mesh. According to a second aspect of the invention, a star configured epicyclic gear train includes inter-star baffles and two lubricant circuits, a primary circuit and an auxiliary circuit, that share a common lubricant discharge path. Ideally, the auxiliary circuit is selectively operable. The invention also embraces methods for lubricating a star configured epicyclic gear train and for effectively evacuating used lubricant.

One significant advantage of the invention is that it promotes evacuation of used lubricant from a star gear system despite the absence of gear carrier rotation and the accompanying centrifugal forces.

A second significant advantage of the invention, particularly the single circuit variant, is its simplicity.

A third advantage of the invention is that it conserves space and reduces weight by minimizing the quantity of lubricant that must be carried on board an aircraft when the inventive gear system is used as a component of an aircraft engine.

A fourth advantage of the invention is that it minimizes the quantity of lubricant requiring evacuation from the gear system and therefore helps to boost efficiency and attenuate undesirable lubricant temperature rise.

A fifth advantage is that the lubricant temperature gradually rises as the lubricant proceeds through the gear system. The temperature rise conforms to the lubricant temperature requirements and temperature tolerances of the gear system components.

BEST MODE FOR CARRYING OUT THE INVENTION

Figure 1:
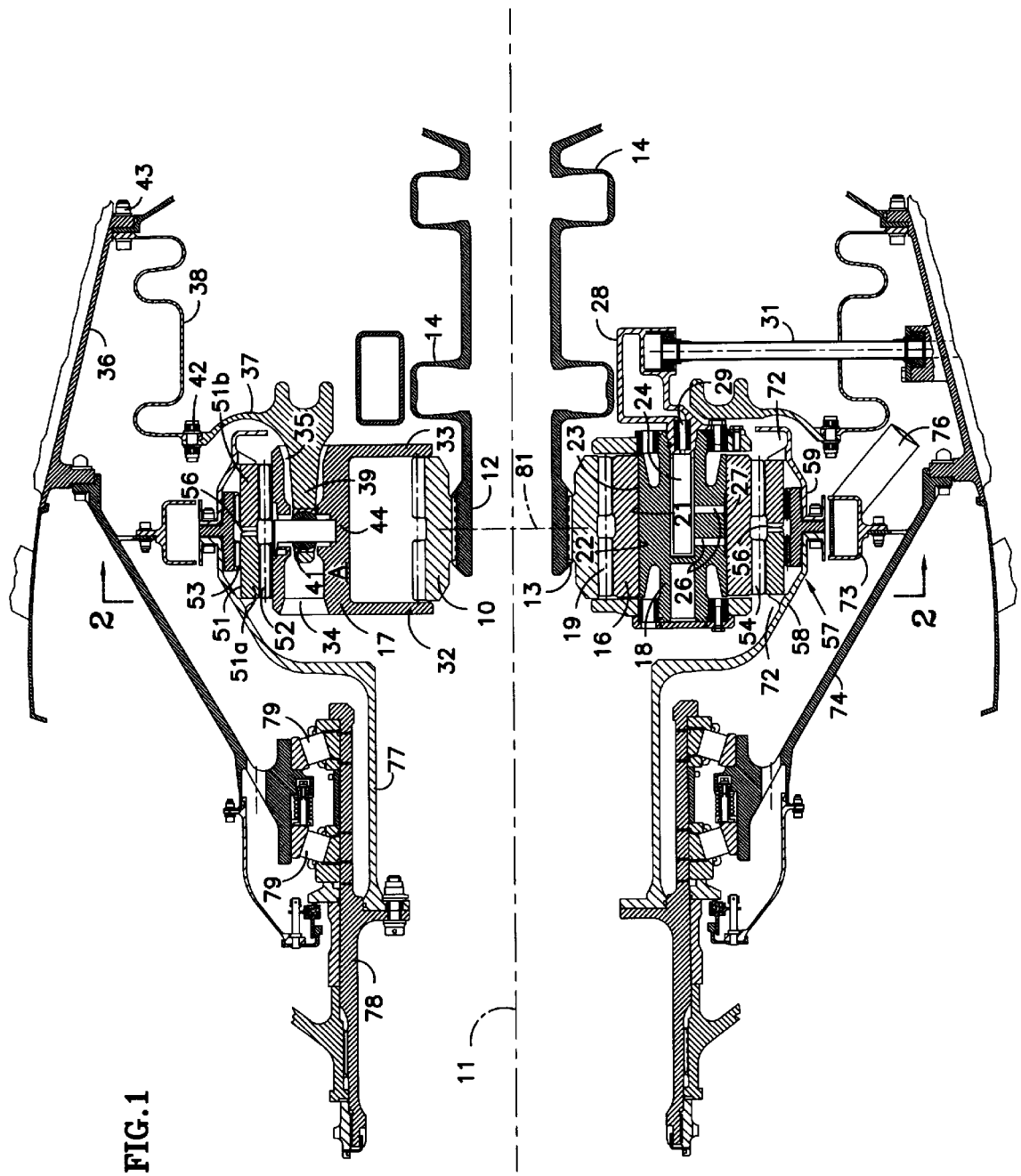
FIG. 1 is a cross sectional side elevation view of the inventive star gear system with a single lubricant circuit.
Figure 2:
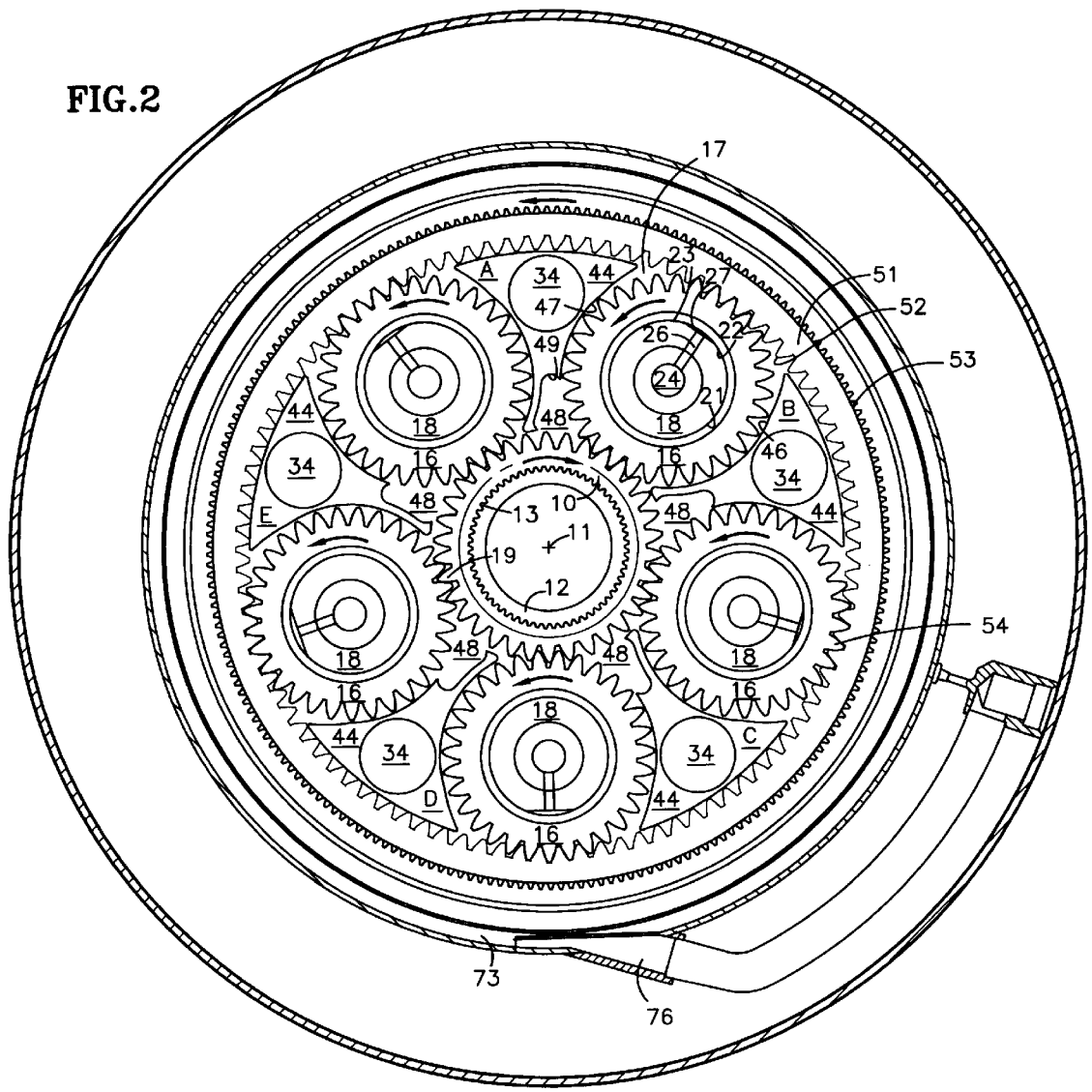
FIG. 2 is a view taken in the direction 2—2 of FIG. 1.
Figure 5:
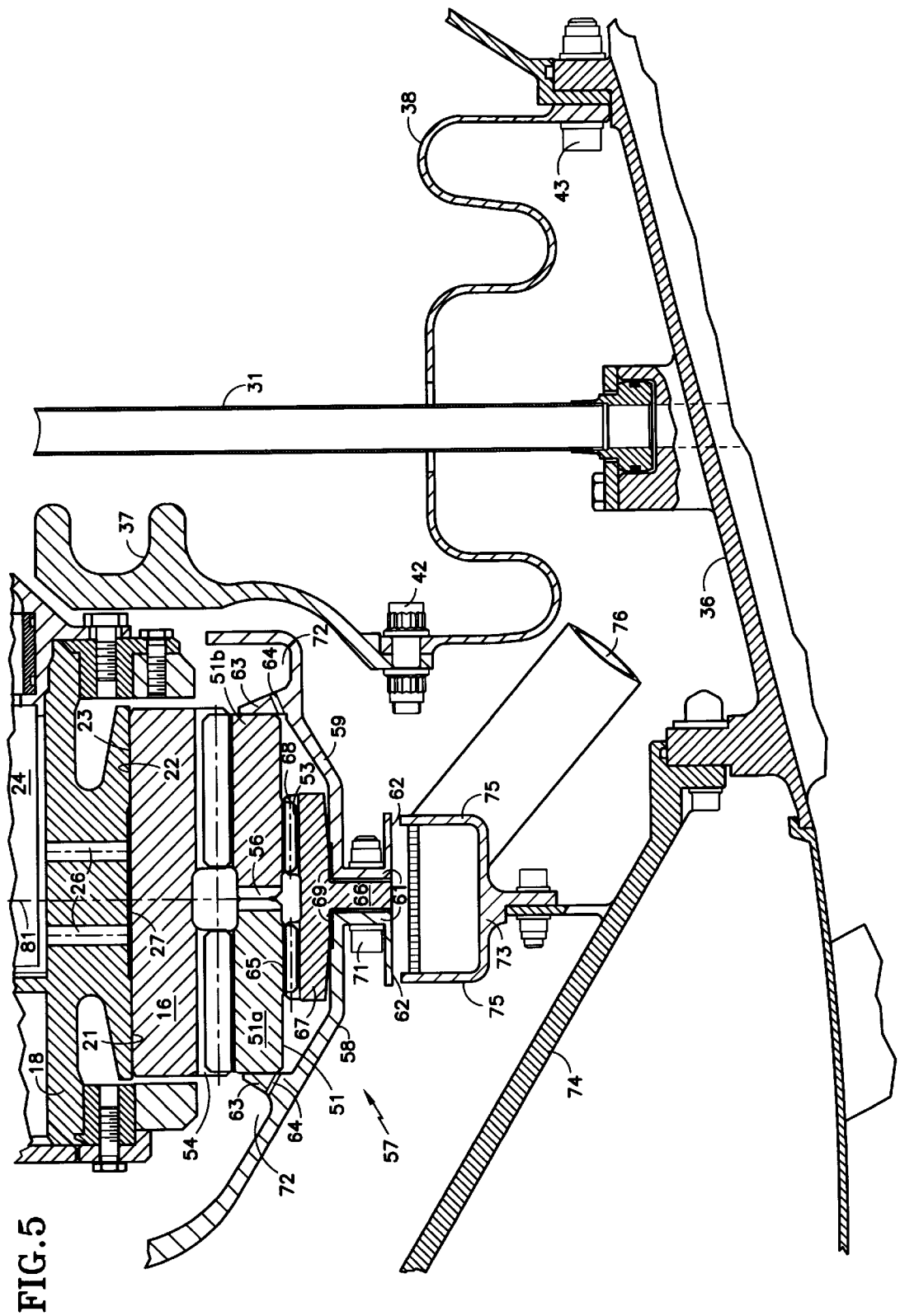
FIG. 5 is a view of the gear train of either FIGS. 1 or 3 enlarged to illustrate certain details of a lubricant discharge path.

Referring to FIGS. 1, 2 and 5, a star gear system for reducing shaft speed in an aircraft engine includes a sun gear 10 rotatable about an axis 11 The sun gear is driven by an input shaft 12 coupled to the sun gear by a spline connection 13. The input shaft includes flexible elements 14 to minimize misalignment between the intermeshing teeth of the sun gear and a set of star gears. The flexible elements 14 are substantially as described in U.S. Pat. No. 5,433,674, the contents of which are incorporated herein by reference.

The gear system includes a plurality of star gears 16 and a nonrotatable star gear carrier 17. Each star gear is rotatably mounted on the carrier by a journal bearing 18 so that the star gears surround the sun gear and are each engaged with the sun gear to define a sun/star mesh 19. The bearing 18 is preferably a load equalizing bearing as described in U.S. Pat. No. 5,102,379, the contents of which are incorporated herein by reference.

A narrow annulus bordered by the radially outer surface 21 of each bearing 18 and the radially inner surface of each star gear 16 defines an interface 23 between each bearing and its respective star gear. The radially inner surface of each star gear is coated as described in U.S. Pat. No. 5,685,797, the contents of which are incorporated herein by reference. Axially and radially extending lubricant conduits 24, 26 penetrate each bearing. The conduits 26 communicate with a shallow, local recess 27 formed in the outer surface of each bearing. Each conduit 24 communicates with an annular lubricant distributor 28 by way of fittings 29. A supply tube 31 connects the distributor to a source of lubricant, not shown.

The gear carrier 17 includes forward and aft side plates 32, 33 having circumferentially distributed openings 34, 35. The carrier is mechanically grounded to an engine case 36 by a torque frame 37 and a flexible coupling 38. The torque frame 37 has a set of axially extending fingers 39 that project through the openings 35 in the aft side plate. A spherical bearing 41 couples each finger to the torque frame. The radially outer end of the torque frame is connected to the forward end of the flexible coupling by a set of fasteners 42. The aft end of the coupling is connected to the engine case by another set of fasteners 43. to mechanically ground the carrier. The torque frame is substantially as described in U.S. Pat. No. 5,466,198 with the exception that the present torque frame conveys torque reactions from the carrier 17 to the case 36 (by way of the flexible coupling 38) whereas the referenced torque frame conveys torque and rotary motion from the carrier of a planetary gear system to the gear system output shaft. The contents of U.S. Pat. No. 5,466,198 are incorporated herein by reference. The flexible coupling 38 is substantially as described in U.S. Pat. No. 5,433,674 with the exception that the present coupling conveys torque reactions from the nonrotatable gear carrier 17 to the case 36 whereas the corresponding coupling of the reference patent conveys torque reactions from a nonrotatable ring gear to an engine case.

As seen best in FIG. 2, the gear carrier also includes a set of baffles, generically designated 44 and individually designated with letters A, B, C, D and E. Each baffle is disposed between two of the star gears. Each baffle has an ascendent flank 46 adjacent the ascending (radially outwardly progressing) side of one of the adjacent star gears and a descendent flank 47 adjacent the descending (radially inwardly progressing) side of the other of the adjacent star gears. The baffle flanks 46, 47 are each arcuately contoured so that the clearance between each flank and the adjacent gear teeth is as small as reasonably possible. The descendent flank 47 of each baffle is foreshortened to define a roughly triangular, axially extending space 48 bordered by the baffle and by sectors of the sun gear and adjacent star gear. It is theorized that the space 48 may facilitate distribution of lubricant in the axial direction. A depression 49 in each baffle extends axially between the forward and aft side plates of the gear carrier. Each depression is substantially parallel to axis 11, i.e. the radial distance between the axis 11 and a representative depression is constant along the entire axial length of the depression. Unlike the visually similar baffle troughs seen in U.S. Pat. No. 5,472,383, the depressions do not serve as a means for evacuating lubricant from the gear system because the carrier, being mechanically grounded, fails to centrifuge lubricant into the depressions. Any lubricant that splashes into the three upper troughs, A, B and E, will immediately drain out. Lubricant may accumulate in the lower troughs C and D. However, since the carrier side plates are not penetrated by openings at the axial extremities of the depressions or by other openings dedicated to the removal of lubricant, accumulated lubricant will remain puddled in troughs C and D.

A rotatable, ring gear 51 comprises forward and aft ring gear sections 51a, 51b having internal gear teeth 52 and external spline teeth 53. The ring gear 51 circumscribes the star gears and engages each star gear to define a star/ring mesh 54. Circumferentially distributed lubricant discharge ports 56 penetrate radially through the ring gear.

As seen most clearly in FIG. 5, a ring gear housing assembly 57 includes forward and aft housing sections 58, 59, each having a bolting flange 61, a splash shield 62 extending axially from each flange, and a gear retainer 63 perforated by circumferentially distributed apertures 64. The housing assembly also includes an antirotation ring 65. The antirotation ring comprises a support ring 66 and an integral spline ring 67 having spline teeth 68. Bolts 71 trap the support ring 66 between the bolting flanges 61 so that the spline teeth 53, 68 couple the housing assembly to the ring gear ensuring that the housing assembly corotates with the ring gear. A series of circumferentially distributed lubricant discharge slots 69 extend axially between the housing sections 58, 59 and the spline ring 67 and radially between the support ring 66 and the flanges 61. The slots 69 are distributed circumferentially intermediate the bolts 71. The gear retainers 63 trap the ring gear axially within the housing assembly and help to define forward and aft annular lubricant collectors 72. A nonrotatatable, circumferentially extending gutter 73 is bolted to bearing support 74 so that gutter sidewalls 75 are nearly in contact with the splash shield 62. A drain pipe 76 extends from the gutter to convey lubricant away from the gear system.

The forward section 58 of the housing assembly 57 includes a cylindrical extension 77 bolted to a power output shaft 78. Tapered roller bearings 79 support the aft end of the output shaft on the bearing support 74.

The sun, star and ring gears are bihelical gears whose teeth, if extended to gear centerplane 81, would form a series of apexes. Depending on the rotational sense of the gears, each apex either leads or trails its constuituent gear teeth. Rotation with the apexes trailing is preferred because it forces lubricant in the gear mesh axially inwardly, toward the centerplane 81 to ensure adequate lubrication across the faces of the gear teeth. Rotational arrows signify the rotational sense of the gears in FIG. 2.

A lubricant circuit extends through the gear system and serves as the exclusive means for supplying lubricant successively to the bearing interfaces, the sun/star mesh and the star/ring mesh. Pressurized lubricant flows successively through the supply tube 31, the annular lubricant distributor 28, the fittings 29, and the bearing conduits 24, 26. The pressurized lubricant is then introduced into each annular bearing interface 23 by way of the bearing recesses 27. Lubricant introduced into a bearing interface spreads out axially and circumferentially to form a load supporting lubricant film between the bearing outer surface 21 and the star gear inner surface 22. The lubricant is then discharged from the axial extremities of the bearing interface. Substantially all of the discharged lubricant is directed into the sun/star mesh 19, partly because of the presence of the nearby descendent baffle flank 47 and partly because of suction created by the rapidly rotating sun and star gears in the space 48. The directed lubricant cools and lubricates the sun and star gear teeth and then is expelled from the sun/star mesh. The nearby ascendent baffle flank then guides substantially all of the expelled lubricant radially outwardly and into the star/ring mesh 54. The lubricant is then ejected from the star/ring mesh.

The ejected lubricant is then centrifugally channeled away from the gear train. Since the action of the bihelical gear teeth tends to force lubricant axially inwardly toward the gear centerplane 81, most of the ejected lubricant flows through the discharge ports 56. The lubricant then flows axially along the spline teeth 53, 68, around the axial extremities of the spline ring 67 and then into the discharge slots 69. The balance of the lubricant enters the collectors 72, and then flows through the apertures 64 and the discharge slots 69. Lubricant that enters slots 69 then flows into the gutter 73. The splash shield 62 helps to confine the lubricant in the gutter. The lubricant then flows into the drain pipe 76, which conveys the lubricant to the lubrication system coolers, filters and deaerators.

As the lubricant proceeds through the gear system, its temperature gradually rises in concert with the lubricant temperature requirements and temperature tolerances of the bearing interface, sun/star mesh and star/ring mesh. The lubricant entering the interface is relatively cool, about 200° F. The bearing interfaces 23 require such cool lubricant to support the tremendous reaction forces that the star gears impose on the bearings. By the time the lubricant exits the interface, its temperature has increased to about 240° F, a temperature not incompatible with the sun/star mesh, which can tolerate warmer lubricant without compromising gear durability or appreciably affecting heat transfer. By the time the lubricant exits the sun/star mesh, its temperature has increased to about 280° F. The 280° lubricant may be suboptimally warm for the sun/star mesh. However it is at least tolerable for the star/ring mesh, which is the next component to be lubricated. The star/ring mesh has greater tolerance for warmer lubricant because there is less relative sliding between the star gear teeth and the ring gear teeth than there is between the sun gear teeth and the star gear teeth.

Figure 3:
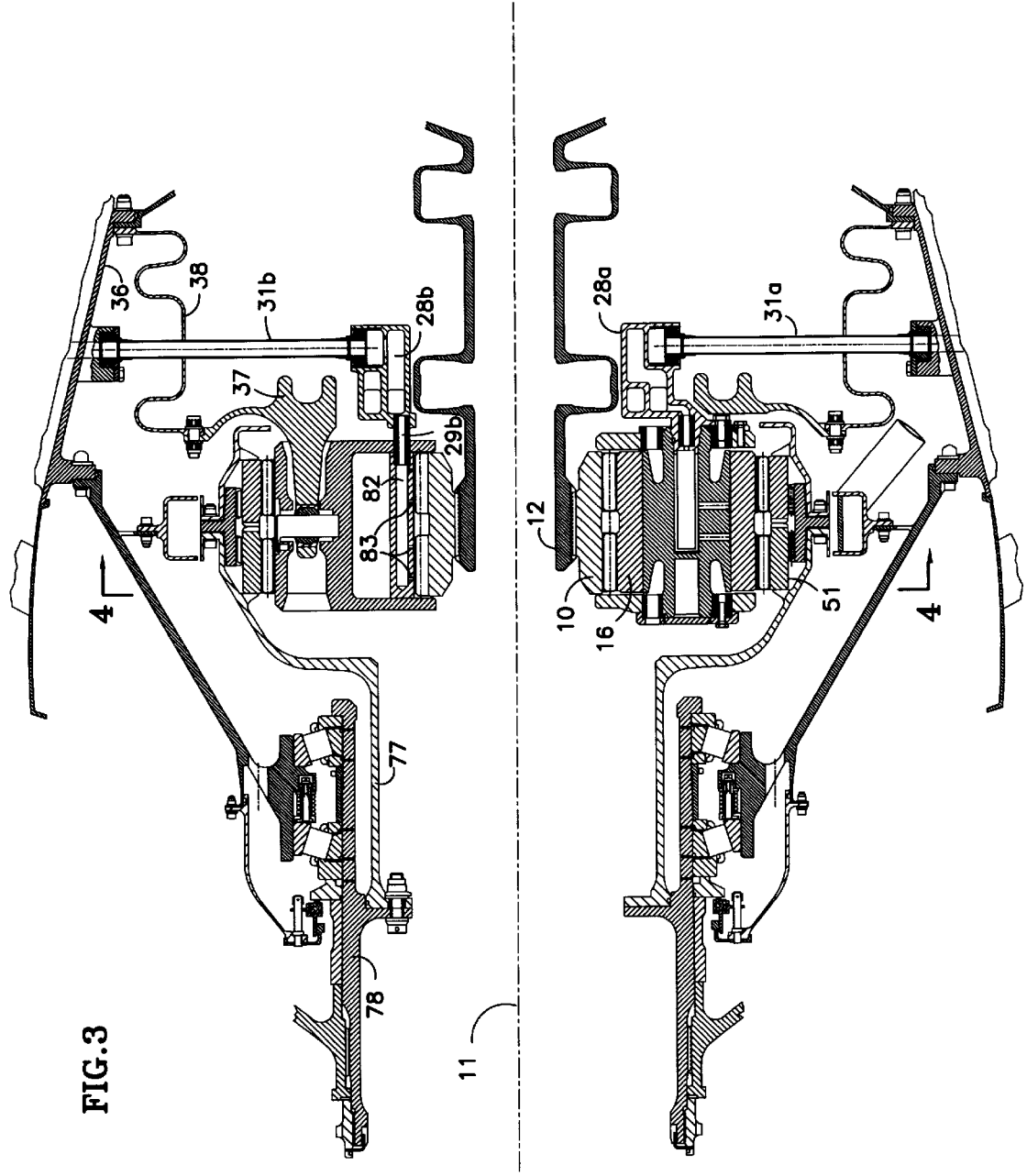
FIG. 3 a cross sectional side elevation view of the inventive star gear system with primary and auxiliary lubricant circuits.
Figure 4:
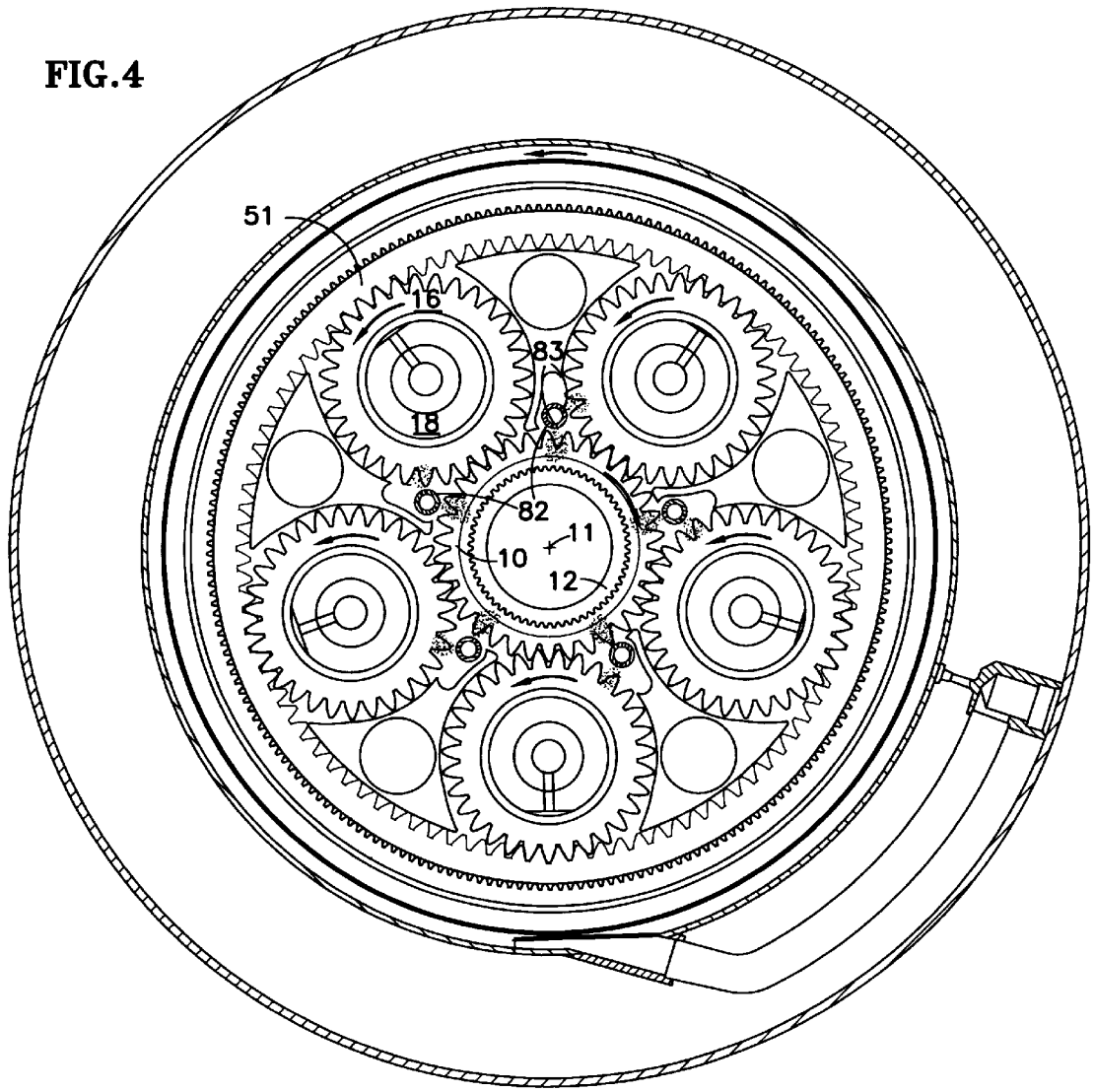
FIG. 4 is a view taken in the direction 4—4 of FIG. 3.

FIGS. 3 and 4 illustrate a variant of the star configured epicyclic gear train just described. The illustrated alternative system includes a primary lubricant circuit and an auxiliary lubricant circuit. The components and operation of the primary circuit are substantially the same as the components and operation of the single lubricant circuit described above. However, in the alternative system, the annular lubricant distributor comprises a primary distributor 28a that receives lubricant from supply tube 31a and an auxiliary distributor that receives lubricant from auxiliary supply tube 31b. Axially extending spray bars 82 having spray orifices 83 are disposed between each pair of star gears. Each spray bar is connected to the auxiliary lubricant distributor 31b by a fitting 29b. The spray bars are part of the auxiliary lubricant circuit.

In operation, the primary circuit operates substantially the same as the single supply circuit described above. The auxiliary circuit introduces jets auxiliary lubricant into the gear system by way of the spray bar orifices 83. Substantially all of the auxiliary lubricant and substantially all of the primary lubricant, concurrently enter the sun/star mesh. Once introduced into the gear system, the auxiliary lubricant comingles with the primary lubricant and follows a common lubricant discharge path. The common lubricant discharge path extends through the sun/star mesh and the star/ring mesh and is the exclusive means for evacuating both the primary lubricant and the auxiliary lubricant. The comingled lubricant is then channeled away from the gear system by way of the discharge ports 56, collectors 72, apertures 64, discharge slots 69, gutter 73. and drain pipe 76 as described above.

The spray bars introduce some additional complexity into the gear system. Moreover, the auxiliary lubricant supplied by the spray bars may result in the accumulation of residual lubricant, and the attendant degradation of power transmission efficiency and lubricant temperature rise described above. Nevertheless, the auxiliary lubrication system may be of value when the lubrication and cooling demands of the gear system exceed the capacity of the primary lubricant circuit. Such capacity exceedance may occur temporarily in an aircraft engine during operation at or near peak power. However, operation at peak power usually occurs only during the relatively brief takeoff and climb segments of an aircraft mission. The longer duration cruise and landing segments of the mission are flown at lower power settings where the primary lubrucation system is more than adequate and the auxiliary system is redundant. Accordingly, it is beneficial to make the auxiliary system selectively operable.

Although the invention has been described with reference to a preferred embodiment thereof, those skilled in the art will appreciate that various changes, modifications and adaptations can be made without departing from the invention as set forth in the accompanying claims.

I claim:

1. A rotary gear train, comprising:

a rotatable sun gear;

a nonrotatable star gear carrier;

a plurality of circumferentially distributed star gears each rotatably mounted on the carrier by a bearing having an interface with its respective star gear and each engaged with the sun gear to define a sun/star mesh;

a rotatable ring gear circumscribing the star gears and engaged with each star gear to define a star/ring mesh;

a set of baffles, each baffle disposed between two star gears; and a lubricant circuit serving as the exclusive means for supplying lubricant successively to the bearing interfaces, the sun/star mesh and the star/ring mesh.

2. The gear train of claim 1 wherein the lubricant circuit includes a lubricant collector corotatable with the ring gear.

3. The gear train of claim 2 wherein the lubricant circuit also includes a nonrotatable gutter circumscribing the collector.

4. The gear train of claim 1 wherein the carrier comprises a pair of side plates unpenetrated by openings dedicated to the removal of lubricant from the gear train.

5. A rotary gear train, comprising:

a rotatable sun gear;

a nonrotatable star gear carrier;

a plurality of circumferentially distributed star gears each rotatably mounted on the carrier by a bearing having an interface with its respective star gear and each engaged with the sun gear to define a sun/star mesh;

a rotatable ring gear circumscribing the star gears and engaged with each star gear to define a star/ring mesh;

a set of baffles, each baffle disposed between two star gears;

a primary lubricant circuit for supplying primary lubricant successively to the bearing interface, the sun/star mesh and the star/ring mesh; and an auxiliary lubricant circuit for supplying auxiliary lubricant to the sun/star mesh and the star/ring mesh;

wherein the primary and auxiliary lubricant circuits include a common lubricant discharge path that extends through the sun/star mesh, the common path being the exclusive means for evacuating both the primary lubricant and the auxiliary lubricant.

6. The gear train of claim 5 wherein the common lubricant discharge path also extends through the star/ring mesh.

7. The gear train of claim 5 wherein the common path includes a lubricant collector corotatable with the ring gear.

8. The gear train of claim 7 wherein the common path also includes a nonrotatable gutter circumscribing the collector.

9. The gear train of claim 6 wherein the common path includes a lubricant collector corotatable with the ring gear.

10. The gear train of claim 9 wherein the common path also includes a nonrotatable gutter circumscribing the collector.

11. The gear train of claim 5 wherein the auxiliary lubricant circuit comprises a set of spray bars, each spray bar disposed between two star gears.

12. The gear train of claim 5 wherein the auxiliary lubricant circuit is selectively operable.

13. The gear train of claim 5 wherein the carrier comprises a pair of side plates unpenetrated by openings dedicated to the removal of lubricant from the gear train.

14. A method of lubricating a gear train having a sun gear, a plurality of star gears each rotatably mounted on a carrier by a bearing having an interface with its respective star gear and each engaged with the sun gear to define a sun/star mesh, and a ring gear circumscribing the star gears and engaged with each star gear to define a star/ring mesh, the method comprising:

introducing lubricant into the bearing interface;

discharging the introduced lubricant from the interface;

directing substantially all of the discharged lubricant into the sun/star mesh;

expelling substantially all of the directed lubricant from the sun/star mesh;

guiding substantially all of the expelled lubricant into the star/ring mesh;

ejecting substantially all of the guided lubricant from the star/ring mesh; and channeling the ejected lubricant away from the gear train.

15. A method of lubricating a gear train having a sun gear, a plurality of star gears each rotatably mounted on a carrier by a bearing having an interface with the star gear and each engaged with the sun gear to define a sun/star mesh, and a ring gear circumscribing the star gears and engaged with each star gear to define a star/ring mesh, the method comprising:

introducing a primary lubricant into the bearing interface;

discharging the introduced primary lubricant from the interface;

concurrently directing substantially all of the discharged first lubricant and an auxiliary lubricant into the sun/star mesh;

expelling substantially all of the directed primary and auxiliary lubricant from the sun/star mesh;

guiding substantially all of the expelled primary and auxiliary lubricant into the star/ring mesh;

ejecting substantially all of the guided primary and auxiliary lubricant from the star/ring mesh; and channeling the ejected primary and auxiliary lubricant away from the gear train.

\* \* \* \* \*